US011050353B2

(12) United States Patent
Yaegaki et al.

(10) Patent No.: US 11,050,353 B2
(45) Date of Patent: Jun. 29, 2021

(54) POWER CONVERSION DEVICE THAT GENERATES SWITCHING SIGNALS (71) Applicant: Hitachi Automotive Systems, Ltd., Hitachinaka (JP)

(72) Inventors: Sho Yaegaki, Hitachinaka (JP); Kenji Kubo, Hitachinaka (JP); Takuma Ono, Hitachinaka (JP); Yuki Yamabe, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/620,000

(22) PCT Filed: Apr. 11, 2018

(86) PCT No.: PCT/JP2018/015174
§ 371 (c)(1),
(2) Date: Dec. 6, 2019

(87) PCT Pub. No.: WO2018/225375
PCT Pub. Date: Dec. 13, 2018

(65) Prior Publication Data
US 2021/0083588 A1 Mar. 18, 2021

(30) Foreign Application Priority Data
Jun. 7, 2017 (JP) .............................. JP2017-112837

(51) Int. Cl.
*H02M 3/00* (2006.01)
*H02M 3/335* (2006.01)
(Continued)

(52) U.S. Cl.
CPC ......... *H02M 3/33576* (2013.01); *B60R 16/02* (2013.01); *H02M 1/088* (2013.01); *H02M 1/32* (2013.01)

(58) Field of Classification Search
CPC ................................................ H02M 3/33576
See application file for complete search history.

(56) References Cited

U.S. PATENT DOCUMENTS

2004/0264219 A1    12/2004   Zhang
2014/0253086 A1*   9/2014   Rosu-Hamzescu ....... H02J 7/00
                                                          323/311

(Continued)

FOREIGN PATENT DOCUMENTS

JP    2004-215356 A    7/2004
JP    2013-106407 A    5/2013
(Continued)

OTHER PUBLICATIONS

International Search Report (PCT/ISA/210) issued in PCT Application No. PCT/JP2018/015174 dated Jun. 19, 2018 with English translation (two (2) pages).

(Continued)

*Primary Examiner* — Adi Amrany
(74) *Attorney, Agent, or Firm* — Crowell & Moring LLP (57) ABSTRACT

A power conversion device capable of suppressing current backflow while also improving current responsiveness and power conversion efficiency is achieved. A snubber capacitor capable of absorbing switching surge is connected to a low-voltage side switching circuit that includes switching elements. Until a predetermined time elapses from when a request to start switching is received, a controller determines that the snubber capacitor has not reached full charge or near-full charge, and asynchronously controls the low-voltage side switching circuit and a high-voltage side switching circuit that includes switching elements. After the predetermined time elapses, the controller synchronously controls the low-voltage side switching circuit and the high-voltage side switching circuit, and also controls a duty ratio of the low-voltage side switching circuit and the high-voltage side (Continued)

switching circuit such that current does not flow back from the low-voltage side switching circuit to the high-voltage side switching circuit.

4 Claims, 6 Drawing Sheets

(51) Int. Cl.
    *B60R 16/02*     (2006.01)
    *H02M 1/088*     (2006.01)
    *H02M 1/32*     (2007.01)

(56) References Cited

U.S. PATENT DOCUMENTS

| | | |
|---|---|---|
| 2015/0036390 A1 | 2/2015 | Ou et al. |
| 2015/0372606 A1 | 12/2015 | Tamura et al. |
| 2016/0087545 A1 | 3/2016 | Higaki et al. |
| 2016/0241152 A1 | 8/2016 | Wakabayashi et al. |
| 2016/0303987 A1 | 10/2016 | Kawamura et al. |
| 2017/0093288 A1* | 3/2017 | Tastekin ............ H02M 3/33584 |
| 2017/0170719 A1* | 6/2017 | Bang ........................ B60L 58/20 |
| 2017/0294843 A1* | 10/2017 | Norisada ........... H02M 3/33546 |
| 2018/0034360 A1* | 2/2018 | Hirabayashi ...... H02M 3/33592 |
| 2018/0342942 A1* | 11/2018 | Iyasu ................. H02M 3/33507 |
| 2019/0027950 A1* | 1/2019 | Carrizales ............. B60L 3/0046 |
| 2020/0287466 A1* | 9/2020 | Sun ..................... H02M 3/3376 |

FOREIGN PATENT DOCUMENTS

| | | |
|---|---|---|
| JP | 2017-42001 A | 2/2017 |
| WO | WO 2015/004825 A1 | 1/2015 |

OTHER PUBLICATIONS

Japanese-language Written Opinion (PCT/ISA/237) issued in PCT Application No. PCT/JP20181015174 dated Jun. 19, 2018 (three (3) pages).

Extended European Search Report issued in European Application No. 18813875.4 dated Feb. 3, 2021 (eight (8) pages).

* cited by examiner

POWER CONVERSION DEVICE THAT GENERATES SWITCHING SIGNALS

TECHNICAL FIELD

The present invention relates to a power conversion device that includes switching elements.

BACKGROUND ART

For example, power conversion devices such as DC-DC converters are known.

PTL 1 discloses a switching power supply device capable of preventing a voltage drop in a power supply connected as a load as well as damage to a switching element.

The switching power supply device described in PTL 1 is provided with a first switching element, a power conversion circuit that converts the power of an input power supply according to the on/off state of the first switching element, a first control circuit that controls the on/off state of the first switching element, a rectifier circuit that rectifies power converted by the power conversion circuit with a second switching element, a second control circuit that controls the second switching element, and a third control circuit that drives the control circuit of the first control circuit before starting the driving of the second control circuit, and stops driving the second circuit before stopping the driving of the first control circuit.

According to the switching device described in PTL 1 above, by eliminating driving by the second control circuit alone and turning the second switching element on and off, the outflow of charge that had been charged in the power supply as a load is prevented, and a voltage drop in the power supply acting as a load as well as damage to the switching element are prevented.

CITATION LIST

Patent Literature

PTL 1: JP 2004-215356 A

SUMMARY OF INVENTION

Technical Problem

Meanwhile, a DC-DC converter serving as a vehicle-mounted power conversion device performs power conversion from a high-voltage side to a low-voltage side, but in this case, it is necessary to prevent the backflow of power (current) from the low-voltage side to the high-voltage side.

In the case of a vehicle-mounted DC-DC converter, ordinarily the low-voltage battery is of lower capacity than the high-voltage battery. For this reason, the occurrence of an unintended current backflow means that current is taken out of the energy source on the low-voltage side, namely the low-voltage battery. This causes excessive consumption of the power in the low-voltage battery, which leads to depletion of the power in the low-voltage battery or wear and damage to the battery. Therefore, it is necessary to prevent current backflow.

One method of preventing the current backflow described above is to stop the switching of the switching element on the low-voltage side of the DC-DC converter and execute power conversion while limiting the direction of current flow with a parasitic diode. Such a method is herein referred to as asynchronous switching operation.

In the case of performing the asynchronous switching operation described above, although current backflow can be prevented, the current responsiveness of the DC-DC converter is significantly degraded. Also, a voltage drop occurs because of the regulating diode, and the power conversion efficiency falls.

Synchronous switching operation exists as the complement to asynchronous switching operation. Synchronous switching operation refers to an operation of controlling the switching of the switching element on the low-voltage side in a DC-DC converter such that the switching timing is synchronized with the switching element on the high-voltage side.

Accordingly, it is conceivable to perform the synchronous switching operation instead of the asynchronous switching operation.

However, in the case of performing the synchronous switching operation, although the current responsiveness and the power conversion efficiency of the DC-DC converter are improved, there is a risk that current backflow will occur.

For this reason, it is necessary to perform asynchronous switching operation to prioritize current backflow prevention, but there is a problem in that a voltage drop occurs and the power conversion efficiency falls.

The present invention has been devised in light of the above issues, and an object thereof is to achieve a power conversion device capable of suppressing current backflow while also improving current responsiveness and power conversion efficiency.

Solution to Problem

One of preferred modes of the invention for solving the aforementioned problems is as follows.

A power conversion device includes: a transformer including a primary winding and a secondary winding; a high-voltage side switching circuit connected between the primary winding of the transformer and a high-voltage side power supply; a low-voltage side switching circuit connected between the secondary winding of the transformer and a low-voltage side power supply; a surge voltage-suppressing capacitor electrically connected in parallel with the low-voltage switching circuit; and a controller configured to control switching states of the high-voltage side switching circuit and the low-voltage side switching circuit.

The controller detects a state of charge of the surge voltage-suppressing capacitor, if the controller determines that the surge voltage-suppressing capacitor has reached full charge or near-full charge, the controller asynchronously controls the switching states of the high-voltage side switching circuit and the low-voltage side switching circuit, and if the controller determines that the surge voltage-suppressing capacitor has not reached full charge or near-full charge, the controller synchronously controls the switching states of the high-voltage side switching circuit and the low-voltage side switching circuit.

Advantageous Effects of Invention

According to the present invention, it is possible to achieve a power conversion device capable of suppressing current backflow while also improving current responsiveness and power conversion efficiency.

DESCRIPTION OF EMBODIMENTS

Hereinafter, exemplary embodiments of the invention will be described with reference to the attached drawings.

EXAMPLES

Before describing Examples of the present invention, the basic principle of the present invention will be described.

If the characteristics of the asynchronous switching operation described above (the operation that stops the switching of the switching element on the low-voltage side of the DC-DC converter and executes power conversion while limiting the direction of current flow with a parasitic diode) and the characteristics of the synchronous switching operation (the operation that controls the switching of the switching element on the low-voltage side of the DC-DC converter such that the switching timing is synchronized with the switching element on the high-voltage side) are taken into account, it is conceivable to adopt a method that selects the asynchronous switching operation in an operating region with a high risk of current backflow (for example, an operating region with a small output current), and selects the synchronous switching operation in an operating region with a low risk of current backflow (for example, an operating region with a large output current).

The expected operating conditions for a vehicle-mounted DC-DC converter include the load current changing suddenly (for example, a change of 100 A/ms) from a no-load/ stopped state, and high responsiveness to such change is demanded.

In the case of selecting between asynchronous switching operation and synchronous switching operation to apply to the operating conditions described above, in the no-load state, the asynchronous switching operation is selected because there is a risk of current backflow.

However, because the current responsiveness is significantly degraded in this case, the asynchronous switching operation is unable to ensure high responsiveness to sudden changes of the load current.

To ensure high responsiveness to sudden changes of the load current, it is necessary to select a control such that the synchronous switching operation is executed immediately after activation with no load.

Because the risk of current backflow exists in the case of selecting a control that performs the synchronous switching operation immediately after no-load activation, it is necessary to set a duty ratio that keeps current backflow from occurring. Herein, the duty ratio refers to the length of periods when the switching elements are switched on.

At this point, a DC-DC converter is typically provided with a clamp circuit (clamp capacitor, or in other words, a surge voltage-suppressing capacitor) for preventing damage to the switching element due to a switching surge. By causing the clamp capacitor to absorb the switching surge, it is possible to keep a surge voltage applied to a switching element at or below the withstand voltage of the element.

As described above, in the case of selecting the synchronous switching operation immediately after no-load activation and selecting a duty ratio that keeps current backflow from occurring to ensure high responsiveness, immediately after activation, a high voltage is applied before the clamp capacitor is charged with sufficient charge, and as a result, a surge voltage exceeding the withstand voltage of the switching element occurs.

It is conceivable to select a duty ratio such that the surge voltage immediately after activation does not exceed the withstand voltage of the switching element, but this duty ratio does not match the duty ratio that should be selected to keep backflow current from occurring, and there is a possibility that backflow current will occur.

Accordingly, in the present invention, the switching states of the high-voltage side switching circuit and the low-voltage side switching circuit of the DC-DC converter are controlled asynchronously until it is detected that the clamp capacitor has reached full charge or near-full charge, and after detecting that the clamp capacitor has reached full charge or near-full charge, the switching states of the high-voltage side switching circuit and the low-voltage side switching circuit are controlled synchronously.

By appropriately selecting the switching duty ratio of the high-voltage side switching circuit until it is detected that the clamp capacitor has reached full charge or near-full charge, it becomes possible to complete the charging of the clamp capacitor while preventing an excessive voltage from being applied to the switching element.

Also, in this case, the above switching duty ratio corresponds to the switching duty ratio that should be selected to avoid exceeding the withstand voltage of the switching element, but this switching duty ratio does not match the duty ratio for keeping current backflow from occurring, and current backflow may occur. However, current backflow is prevented because the asynchronous switching operation is selected. After detecting that the clamp capacitor has reached full charge or near-full charge, the switching duty ratio of the high-voltage side switching circuit corresponds to the switching duty ratio that should be selected to keep current backflow from occurring. Because the charging of the clamp capacitor is nearly complete, an excessive voltage is not applied to the switching element.

According to the above basic principle of the present invention, it is possible to complete the charging of the clamp capacitor without exceeding the switching element withstand voltage while also preventing current backflow, and it is possible to rapidly change over to (expand the operating region of) the synchronous switching operation capable of highly responsive and highly efficient operation.

Next, Examples based on the basic principle of the present invention will be described.

Example 1

Figure 1:
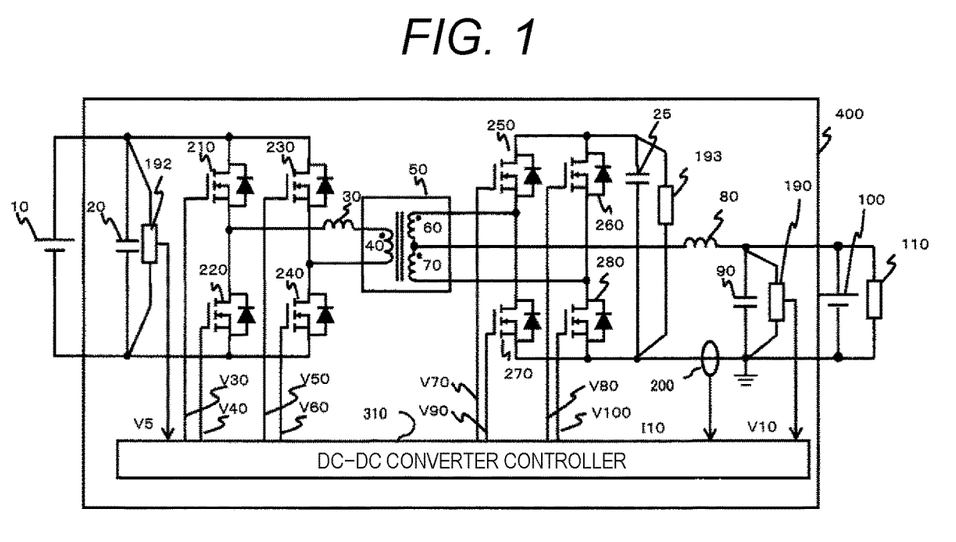
FIG. 1 is a circuit diagram of a DC-DC converter, which is a power conversion device according to Example 1 of the present invention.

FIG. 1 is a circuit diagram of a DC-DC converter 400, which is a power conversion device according to Example 1 of the present invention. The DC-DC converter 400 is a power conversion device onboard a vehicle, for example.

In the DC-DC converter 400 of FIG. 1, a primary circuit (described later), which is disposed on the left side of a transformer 50 in FIG. 1 and which converts DC to AC, is connected to a high-voltage side battery (high-voltage side power supply) 10, while a secondary circuit (described later), which is disposed on the right side of the transformer 50 and which converts AC to DC, is connected to a low-voltage side battery (low-voltage side power supply) 100 and an auxiliary load 110 (hereinafter, the load 110) in parallel. The primary circuit and the secondary circuit are magnetically coupled through the transformer 50.

The primary circuit of the DC-DC converter 400 includes a filter capacitor 20, a voltage sensor 192, MOSFETs 210, 220, 230, and 240, and a resonating inductor 30.

The secondary circuit of the DC-DC converter 400 includes a smoothing capacitor 90, a smoothing inductor 80, a snubber capacitor (clamp capacitor; surge voltage-suppressing capacitor) 25 a voltage sensor 190, a current sensor 200, and MOSFETs 250, 260, 270, and 280. The transformer 50 is connected to the primary circuit and the secondary circuit. The snubber capacitor 25 is connected in parallel to low-voltage side switching circuits that include switching elements 250, 260, 270, and 280.

The high-potential side of the high-voltage side battery 10 is connected to one terminal of the filter capacitor 20, one terminal of the voltage sensor 192, and the drain of the MOSFETs 210 and 230. Also, the low-potential side of the high-voltage side battery 10 is connected to the other terminal of the filter capacitor 20, the other terminal of the voltage sensor 192, and the source of the MOSFETs 220 and 240. Also, for the high-voltage side battery 10, a battery such as a nickel-metal hydride battery or a lithium-ion battery is used, for example.

The voltage sensor 192 is configured by an amplifier such as a non-inverting amplifier or a differential amplifier using a voltage divider and an operational amplifier.

The source of the MOSFET 210 is connected to the drain of the MOSFET 220 and one terminal of the resonating inductor 30.

The drain of the MOSFET 220 is connected to the source of the MOSFET 210 and one terminal of the resonating inductor 30, and the source of the MOSFET 220 is connected to the low-voltage side of the high-voltage battery 10, the other terminal of the filter capacitor 20, the other terminal of the voltage sensor 192, and the source of the MOSFET 240.

The source of the MOSFET 230 is connected to the drain of the MOSFET 240 and the other terminal of the resonating inductor 30 via a primary winding 40.

The drain of the MOSFET 240 is connected to the source of the MOSFET 230 and the other terminal of the resonating inductor 30 via the primary winding 40, and the source of the MOSFET 240 is connected to the low-voltage side of the high-voltage battery 10, the other terminal of the filter capacitor 20, the other terminal of the voltage sensor 192, and the source of the MOSFET 220.

The other terminal of the resonating inductor 30 is connected to one terminal of the primary winding 40 of the transformer 50, but the resonating inductor 30 may also be substituted with the leakage inductance or the lead inductance of the transformer 50.

The transformer 50 includes the primary winding 40 and secondary windings 60 and 70.

One terminal of the primary winding 40 of the transformer 50 is connected to the resonating inductor 30, while the other terminal of the primary winding 40 is connected to the source of the MOSFET 230 and the drain of the MOSFET 240.

One terminal of the secondary winding 60 of the transformer 50 is connected to the source of the MOSFET 250 and the drain of the MOSFET 270, while the other terminal of the secondary winding 60 is connected to one terminal of the secondary winding 70 of the transformer 50 and one terminal of the smoothing inductor 80.

One terminal of the secondary winding 70 of the transformer 50 is connected to the other terminal of the secondary winding 60 of the transformer 50 and one terminal of the smoothing inductor 80, while the other terminal of the secondary winding 70 is connected to the source of the MOSFET 260 and the drain of the MOSFET 280.

The drain of the MOSFET 250 is connected to one terminal of the snubber capacitor 25, while the source of the MOSFET 250 is connected to the other terminal of the secondary winding 60 of the transformer 50 and the drain of the MOSFET 270.

The drain of the MOSFET 260 is connected to one terminal of the snubber capacitor 25, while the source of the MOSFET 260 is connected to one terminal of the secondary winding 70 of the transformer 50 and the drain of the MOSFET 280.

The drain of the MOSFET 270 is connected to one terminal of the secondary winding 60 of the transformer 50 and the source of the MOSFET 250, while the source of the MOSFET 270 is connected to the other terminal of the snubber capacitor 25 and one terminal of the current sensor 200.

The drain of the MOSFET 280 is connected to the other terminal of the secondary winding 70 of the transformer 50 and the source of the MOSFET 260, while the source of the MOSFET 280 is connected to the other terminal of the snubber capacitor 25 and one terminal of the current sensor 200.

One terminal of the snubber capacitor 25 is connected to the drain of the MOSFET 260 and the drain of the MOSFET 250, while the other terminal of the snubber capacitor 25 is connected to the source of the MOSFET 270, the source of the MOSFET 280, and one terminal of the current sensor 200.

One terminal of a voltage sensor 193 is connected to the drain of the MOSFETs 250 and 260, while the other terminal of the voltage sensor 193 is connected to the source of the MOSFET 270, the source of the MOSFET 280, and one terminal of the current sensor 200. The voltage sensor 193 is configured by an amplifier such as a non-inverting amplifier or a differential amplifier using a voltage divider and an operational amplifier.

One terminal of the smoothing inductor 80 is connected to the other terminal of the secondary winding 60 and one terminal of the secondary winding 70 of the transformer 50, while the other terminal of the smoothing inductor 80 is connected to one terminal of the smoothing capacitor 90, one terminal of the voltage sensor 190, the high-potential side of the low-voltage battery 100, and one terminal of the load 110.

One terminal of the smoothing capacitor 90 is connected to one terminal of the smoothing inductor 80, one terminal of the voltage sensor 190, the high-potential side of the low-voltage battery 100, and one terminal of the load 110, while the other terminal of the smoothing capacitor 90 is connected to the other terminal of the voltage sensor 190, the other terminal of the current sensor 200, the low-potential side of the low-voltage battery 100, and the other terminal of the load 110.

One terminal of the voltage sensor 190 is connected to one terminal of the smoothing inductor 80, one terminal of the smoothing capacitor 90, the high-potential side of the low-voltage battery 100, and one terminal of the load 110, while the other terminal of the voltage sensor 190 is connected to the other terminal of the smoothing capacitor 90, the other terminal of the current sensor 200, the low-potential side of the low-voltage battery 100, and the other terminal of the load 110. The voltage sensor 190 is configured by an amplifier such as an inverting amplifier or a differential amplifier using a voltage divider and an operational amplifier.

One terminal of the current sensor 200 is connected to the source of the MOSFET 270, the source of the MOSFET 280, and the other terminal of the snubber capacitor 25, while the other terminal of the current sensor 200 is connected to the other terminal of the smoothing capacitor 90, the other terminal of the voltage sensor 190, the low-potential side of the low-voltage battery 100, and the other terminal of the load 110. The current sensor 200 is configured by a shunt resistor, a Hall effect sensor, or the like.

One terminal of the low-voltage side battery 100 is connected to one terminal of the smoothing inductor 80, one terminal of the voltage sensor 190, one terminal of the smoothing capacitor 90, and one terminal of the load 110, while the other terminal of the low-voltage side battery 100 is connected to the other terminal of the smoothing capacitor 90, the other terminal of the voltage sensor 190, the other terminal of the current sensor 200, and the other terminal of the load 110. A battery such as a lead storage battery is adopted as the low-voltage side battery 100.

One terminal of the load 110 is connected to one terminal of the smoothing inductor 80, one terminal of the voltage sensor 190, one terminal of the smoothing capacitor 90, and the high-potential side of the low-voltage battery 110, while the other terminal of the load 110 is connected to the other terminal of the smoothing capacitor 90, the other terminal of the voltage sensor 190, the other terminal of the current sensor 200, and the low-potential side of the low-voltage battery 110.

A controller 310 of the DC-DC converter 400 generates a gate voltage V30 for controlling the on/off state of a switching element of the DC-DC converter 400, namely the MOSFET 210, on the basis of an input voltage V5, an output voltage V10, and an output current I10, and inputs the generated gate voltage V30 into the gate of the MOSFET 210.

Similarly, the controller 310 inputs a gate voltage V40 into the gate of the MOSFET 220, inputs a gate voltage V50 into the gate of the MOSFET 230, and inputs a gate voltage V60 into the gate of the MOSFET 240. Also, the controller 310 inputs a gate voltage V70 into the gate of the MOSFET 250, inputs a gate voltage V80 into the gate of the MOSFET 260, inputs a gate voltage V90 into the gate of the MOSFET 270, and inputs a gate voltage V100 into the gate of the MOSFET 280.

Figure 2:
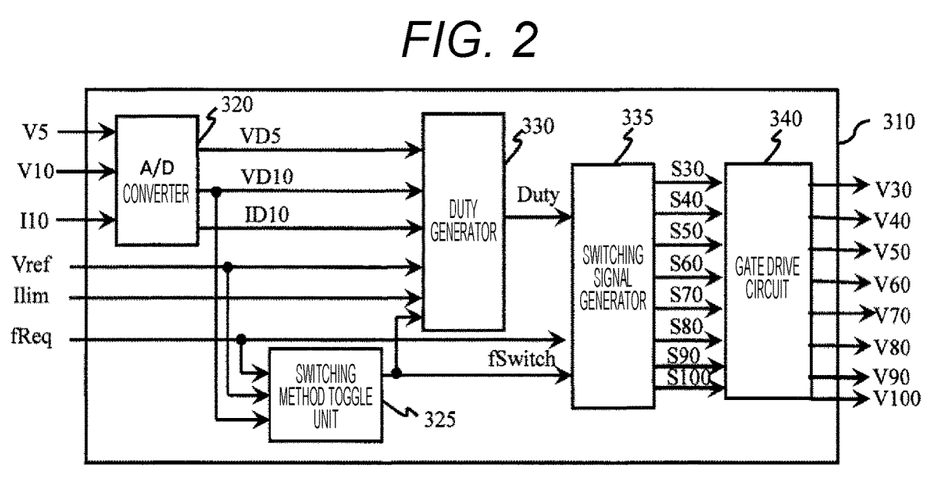
FIG. 2 is a diagram explaining a controller of the DC-DC converter according to Example 1 of the present invention.

FIG. 2 is a diagram explaining the controller 310 of the DC-DC converter 400 according to Example 1 of the present invention, and is an internal function block diagram.

In FIG. 2, the controller 310 of the DC-DC converter 400 is provided with an A/D converter 320 that converts analog values into digital values, a switching method toggle unit 325, a duty generator 330, a switching signal generator 335, and a gate drive circuit 340.

The A/D converter 320 converts the analog value of the input voltage V5 of the DC-DC converter 400 detected by the voltage sensor 192 into a digital value VD5. The A/D converter 320 also converts the analog value of the output voltage V10 of the DC-DC converter 400 detected by the voltage sensor 190 into a digital value VD10. The A/D converter 320 also converts the analog value of the output current I10 of the DC-DC converter 400 detected by the current sensor 200 into a digital value ID10.

The switching method toggle unit 325 generates a switching method toggle flag fswitch for toggling the switching method of the switching elements, namely the MOSFETs 210, 220, 230, 240, 270, and 280, on the basis of an output voltage command Vref as well as an operation command fReq received from an external controller (not illustrated) and the digital value VD10 of the output voltage.

The duty generator 330 generates the duty ratio (Duty) of the MOSFETs 210, 220, 230, and 240 on the basis of a current limit value Ilim as well as the output voltage command Vref received from the external controller (not illustrated), the output voltage digital value VD10, and the digital value ID10 of the output current I10.

The switching signal generator 335 generates on/off signals (switching signals for switching the low-voltage side switching circuit and for switching the high-side switching circuit) S30, S40, S50, S60, S70, S80, S90, and S100 of the MOSFETs 210, 220, 230, 240, 270, and 280 of the DC-DC converter 400, on the basis of the duty ratio (Duty) of the MOSFETs 210, 220, 230, and 240 of the DC-DC converter 400 generated by the duty generator 330 and the switching method toggle flag fswitch generated by the switching method toggle unit 325.

The gate drive circuit 340 generates gate voltages V30, V40, V50, V60, V70, V80, V90, and V100 for switching on/off the switching elements of the DC-DC converter 400, namely the MOSFETs 210, 220, 230, 240, 250, 260, 270, and 280 on the basis of the on/off signals S30, S40, S50, S60, S70, S80, S90, and S100 of the MOSFETs 210, 220, 230, 240, 250, 260, 270, and 280 of the DC-DC converter 400 generated by the switching signal generator 335.

Figure 3:
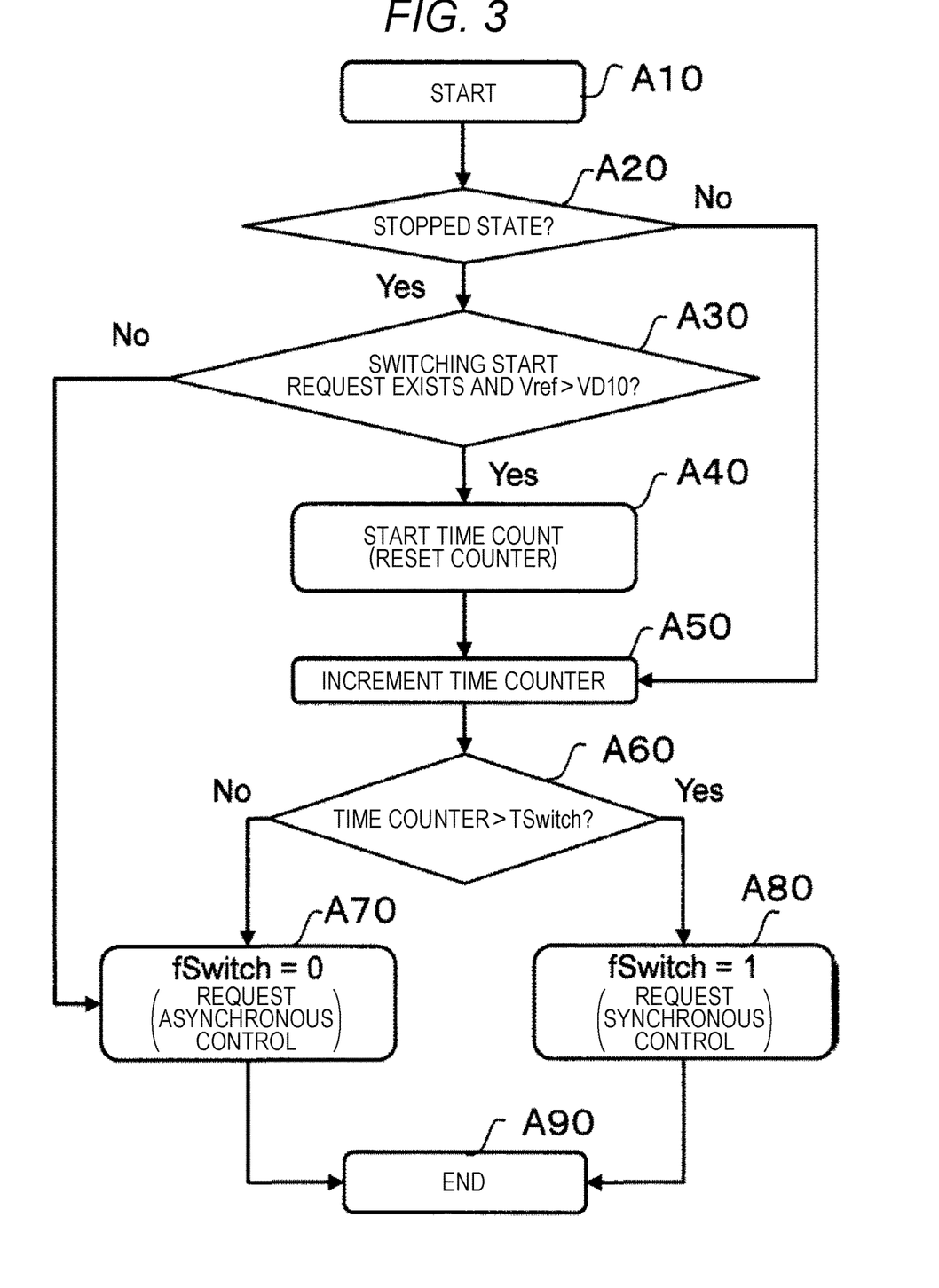
FIG. 3 is a flowchart explaining a process for one processing cycle executed by a switching control method toggle unit according to Example 1 of the present invention.

FIG. 3 is a flowchart explaining a process for one processing cycle executed by the switching method toggle unit 325 of the controller 310. Following the flow in FIG. 3, the switching method toggle unit 325 executes a repeating process. The process illustrated by the flow in FIG. 3 detects the state of charge of the snubber capacitor 25 according to whether or not a time counter has exceeded a fixed time TSwitch, determines that the snubber capacitor 25 has reached full charge or near-full charge, and determines whether to set a synchronous control mode or an asynchronous control mode.

In step A10 of FIG. 3, the process is started, and the flow proceeds to step A20. In step A20, it is determined whether or not switching operations of the DC-DC converter 400 are in a stopped state, and if determined to be in a stopped state, the flow proceeds to step A30. In step A20, if the switching operations are determined not to be in a stopped state, the flow proceeds to step A50.

In step A30, the operation command fReq is monitored to confirm whether a switching start request exists (condition 1) and also whether the output voltage command Vref exceeds the digital value VD10 of the output voltage (condition 2). In the case in which the above conditions 1 and 2 hold at the same time, the flow proceeds to step A40. In step A30, if either or both of the conditions do not hold, the flow proceeds to step A70. In step A40, when the flow has reached step A40 through the branching of steps A20 and A30, switching operations are in a stopped state and a switching start request has also been received. In this state, a time counter (not illustrated) is reset, and a count is started.

Next, the flow proceeds to step A50, the time counter is incremented by one cycle, and the flow proceeds to step A60.

In step A60, it is determined whether the time counter exceeds a predetermined value Tswitch stored in the controller 310 in advance, or in other words, whether or not the predetermined time Tswitch has elapsed. If the predetermined time Tswitch has not elapsed, the flow proceeds to step A70, whereas if the predetermined Tswitch has elapsed, the flow proceeds to step A80.

In step A70, the switching method toggle flag fswitch is set to 0 and output. In the case where the switching method toggle flag fswitch is set to 0, the switching signal generator 335 is requested to perform operations in the switching control mode (asynchronous control mode) that stops the switching operations of the MOSFETs 270 and 280. After the output of a signal requesting operation in the asynchronous control mode is completed, the flow proceeds to step A90.

In step A80, the switching method toggle flag fswitch is set to 1 and output. In the case where the switching method toggle flag fswitch is set to 1, the switching signal generator 335 is requested to perform operations in the switching control mode (synchronous control mode) that executes the switching operations of the MOSFETs 250, 260, 270, and 280 in synchronization with the MOSFETs 210, 220, 230, and 240. After the output of a signal requesting operation in the synchronous control mode is completed, the flow proceeds to step A90.

In step A90, the process for one processing cycle executed by the switching method toggle unit 325 ends.

Figure 4:
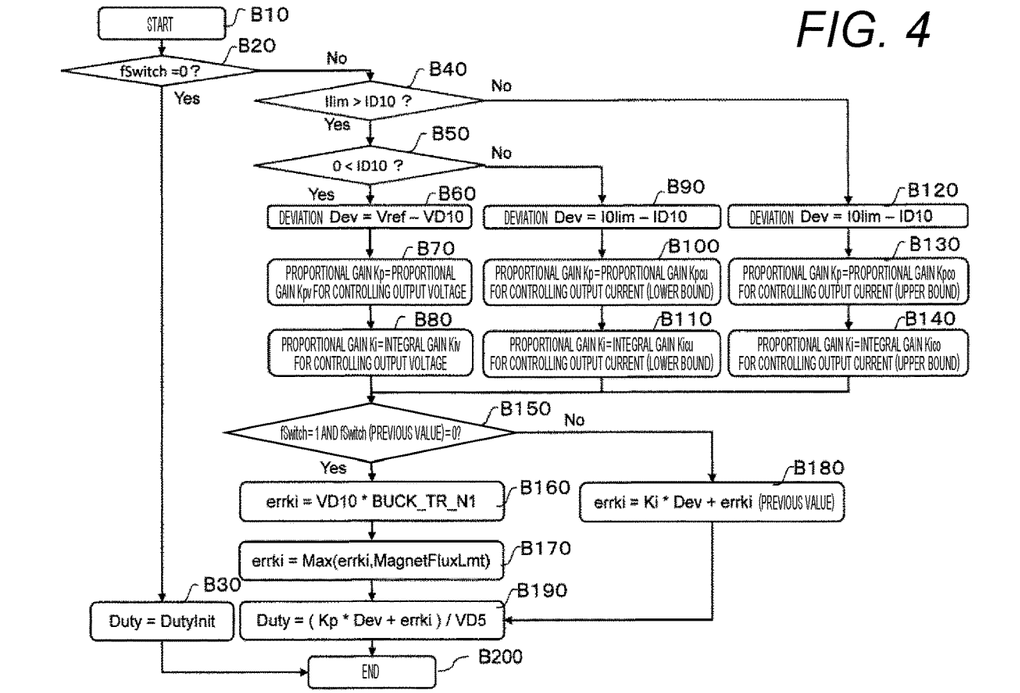
FIG. 4 is a flowchart explaining a process for one processing cycle performed by a duty generator according to Example 1 of the present invention.

FIG. 4 is a flowchart explaining a process for one processing cycle performed by the duty generator 330. Following this flow, the duty generator 330 executes a repeating process.

In step B10 of FIG. 4, the process is started, and the flow proceeds to step B20. In step B20, it is monitored whether or not the switching method toggle flag fswitch is 0. If 0 (the case of the asynchronous mode), the flow proceeds to step B30, whereas if not 0 (the case of the synchronous mode), the flow proceeds to step B40.

In step B30, an initial value DutyInit stored in the controller 310 in advance is output as Duty. After the process is complete, the flow proceeds to step B200. It is desirable for the initial value DutyInit to be a Duty whereby an excessive flow of inrush current into the snubber capacitor 25 and application of an excessive voltage may be avoided.

In step B40, it is determined whether or not the digital value ID10 of the output current I10 of the current sensor 200 is less than the current limit value Ilim, and if less than the current limit value Ilim, the flow proceeds to step B50. If ID10 is equal to or greater than the current limit value Ilim, the flow proceeds to step B120.

In step B50, it is determined whether or not the digital value ID10 of the output current I10 is a value greater than 0, and if greater than 0, the flow proceeds to step B40, whereas if less than 0, the flow proceeds to step B90.

In step B60, the difference (deviation) Dev between the output voltage command Vref and the output voltage digital value VD10 is computed, and the flow proceeds to step 70.

In step B70, a proportional gain Kp is set to a proportional gain Kpv for controlling the output voltage, and the flow proceeds to step B80.

In step B80, a proportional gain Ki is set to a proportional gain Kiv for controlling the output voltage, and the flow proceeds to step B150.

In step B90 proceeding from step B50, the difference (deviation) Dev between a current limit value (lower bound) I0lim and the output current digital value ID10$tp$ is computed, and the flow proceeds to step 100. Note that for the current limit value (lower bound) I0lim, a predetermined value stored in the controller 310 in advance is used.

In step B100, the proportional gain Kp is set to a proportional gain Kpcu for controlling the output current (lower bound), and the flow proceeds to step B110.

In step B110, the proportional gain Ki is set to an integral gain Kicu for controlling the output current (lower bound), and the flow proceeds to step B150.

In step B120 proceeding from step B40, the difference (deviation) Dev between a current limit value (upper bound) I0lim and the output current digital value ID10 is computed, and the flow proceeds to step 130.

In step B130, the proportional gain Kp is set to a proportional gain Kpco for controlling the output current (upper bound), and the flow proceeds to step B140.

In step B140, the proportional gain Ki is set to an integral gain Kico for controlling the output current (upper bound), and the flow proceeds to step B150.

In step B150, it is monitored whether or not the switching method toggle flag fswitch has changed from 0 to 1. In other words, it is monitored whether the switching method toggle flag fswitch is 1 and also whether the previous switching method toggle flag fswitch was 0. In the case of a switch from 0 to 1, the flow proceeds to step B160. Otherwise, the flow proceeds to step B180. At this point, a switch from 0 to 1 means a switch from the asynchronous control mode (the switching control mode that stops the switching operations of the MOSFETs 250, 260, 270, and 280) to the synchronous control mode (the switching control mode that executes the switching operations of the MOSFETs 250, 260, 270, and 280 in synchronization with the MOSFETs 210, 220, 230, and 240).

In step B160, the output voltage digital value VD10 and a winding ratio Buck_TR_N1 between the primary winding 40 and the secondary windings 60 and 70 of the transformer 50 are used to compute an integral term errki according to the following Formula (1).

$$\text{errki} = VD10 * \text{BUCK\_TR\_N1} \tag{1}$$

After using the above Formula (1) to compute the integral term errki, the flow proceeds to step B170.

In step B170, an upper limiting process is performed on the integral term errki. Specifically, in the case in which the integral term errki exceeds an upper limit value MagnetFluxLmt, errki is set to errki=MagnetFluxLmt, and otherwise errki is output directly without performing any process. After the upper limiting process is complete, the flow proceeds to step B190. It is desirable to set the upper limit value MagnetFluxLmt to a value that does not induce magnetic saturation of the transformer 50.

In step B180 proceeding from step B150, the difference Dev and the integral gain Ki are used to compute the integral term errki. At this time, the previous value of the integral term errki is utilized to compute errki according to the following Formula (2).

$$\text{errki} = \text{Dev} * Ki + \text{errki (previous value)} \tag{2}$$

After using the above Formula (2) to compute the integral term errki in step B180, the flow proceeds to step B190.

In step B190, the digital value VD5 of the input voltage V5, the proportional gain Kp, the deviation Dev, and the integral term errki are used to compute Duty according to the following Formula (3).

$$\text{Duty} = (Kp * \text{Dev} + \text{errki})/VD5 \quad (3)$$

After computing Duty using the above Formula (3) in step B190, the flow proceeds to step B200.

In step B200, the process for one processing cycle performed by the duty generator 330 ends.

Next, the switching signal generator 335 provided in the controller 310 of the DC-DC converter 400 that is a power conversion device according to Example 1 of the present invention will be described.

As described in FIG. 2, the switching signal generator 335 generates the on/off signals S30 to S100 for the MOSFETs 210 to 280 of the DC-DC converter 400 on the basis of the duty ratio (Duty) input from the duty generator 330. The method of generating the on/off signals S30 to S100 may be phase-shifted PWM for example.

Figure 5:
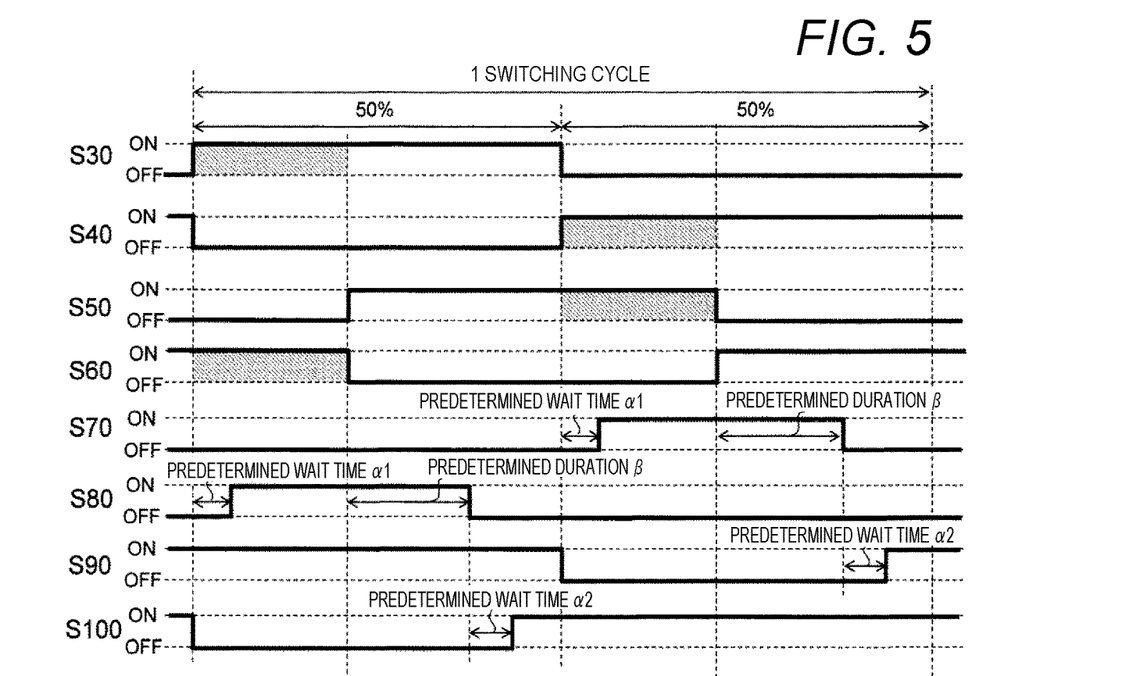
FIG. 5 is a diagram explaining operations in a synchronous control method of the DC-DC converter according to a first embodiment of the present invention.

FIG. 5 is a diagram explaining synchronization control, that is, operations performed in the case in which the switching method toggle flag fSwitch is 1 (synchronous control mode) in one form of the switching signal generator 335 applying phase-shifted PWM provided in the controller 310 of the DC-DC converter 400 according to the first Example of the present invention.

In FIG. 5, the switching signal generator 335 locks the ratio of the on-time and the off-time of the on/off signals S30 to S60 at 50%, and in addition, varies the phase difference of the on/off signals S30 to S60.

Subsequently, the switching signal generator 335 adjusts the periods during which the on/off signal S30 of the MOSFET 210 and the on/off signal S60 of the MOSFET 240 are both on and the periods during which the on/off signal S40 of the MOSFET 220 and the on/off signal S50 of the MOSFET 230 are both on to be equal to the duty ratio (Duty) generated by the duty generator 330. With this arrangement, the DC-DC converter 400 can match the output voltage or the output current to the respective command value.

Herein, as one example, a method will be described in which the on/off signal S30 of the MOSFET 210 of the primary circuit of the DC-DC converter 400 is treated as a standard by which to generate the on/off signals S30 to S100 of the MOSFETs 210 to 280 of the DC-DC converter 400.

First, the switching signal generator 335 generates the on/off signal S30 of the MOSFET 210 of the primary circuit of the DC-DC converter 400. The on/off signal S30 is generated with a pulse signal in which the ratio of the on-time and the off-time is locked at 50%. For example, provided that the switching frequency is Fsw [Hz], the on-time and the off-time of the on/off signal S30 are expressed by Formula (4) below. In other words, the on-time and the off-time of the on/off signal S30 become 50% each of one switching cycle.

$$S30 \text{ on-time} = S30 \text{ off-time} = 0.5/Fsw \quad (4)$$

Next, the switching signal generator 335 generates the on/off signal S40 of the MOSFET 220. The on/off signal S40 is generated to be off while the on/off signal S30 is on, and on while the on/off signal S30 is off.

Next, the switching signal generator 335 generates the on/off signal S50 of the MOSFET 230. The on/off signal S50 is generated to turn on after the on/off signal S30 turns on with a delay equal to the duty ratio (Duty) generated by the duty generator 330, and to turn off when 50% of the duration of one switching cycle has elapsed.

Next, the switching signal generator 335 generates the on/off signal S60 of the MOSFET 240. The on/off signal S60 is generated to turn on after the on/off signal S40 turns on with a delay equal to the duty ratio (Duty) generated by the duty generator 330, and to turn off when 50% of the duration of one switching cycle has elapsed.

By generating the on/off signals S30 to S60 in this way, the periods during which the on/off signal S30 and the on/off signal S60 are both on and the periods during which the on/off signal S40 and the on/off signal S50 are both on can be adjusted to be equal to the duty ratio (Duty) generated by the duty generator 330.

Next, the switching signal generator 335 generates the on/off signal S70 of the MOSFET 250. The on/off signal S70 turns on after the on/off signal S30 turns off, but delayed by a predetermined wait time $\alpha 1$. Additionally, the on/off signal S70 is generated to turn off when a time equal to the sum of the duty ratio (Duty) generated by the duty generator 330 and a predetermined duration $\beta$ has elapsed since the on/off signal S30 turned off.

Next, the switching signal generator 335 generates the on/off signal S80 of the MOSFET 260. The on/off signal S80 turns on after the on/off signal S40 turns off, but delayed by a predetermined wait time $\alpha 1$. Additionally, the on/off signal S80 is generated to turn off when a time equal to the sum of the duty ratio (Duty) and a predetermined duration $\beta$ has elapsed since the on/off signal S40 turned off.

By generating the on/off signal S70 and the on/off signal S80 in this way, it is possible to reduce the circulating current produced in the periods during which the on/off signal S30 and the on/off signal S50 are both on and the periods during which the on/off signal S40 and the on/off signal S60 are both on. Furthermore, the surge energy accumulated in the snubber capacitor 25 of the secondary circuit of the DC-DC converter 400 can be supplied to the load 110. With this arrangement, the efficiency of the DC-DC converter 400 can be increased.

Next, the switching signal generator 335 generates the on/off signal S90 of the MOSFET 270. The on/off signal S90 turns on after the on/off signal S70 turns off, but delayed by a predetermined wait time $\alpha 2$. Additionally, the on/off signal S90 is generated to turn off at the same time as when the on/off signal S30 turns off.

Next, the switching signal generator 335 generates the on/off signal S100 of the MOSFET 280. The on/off signal S100 turns on after the on/off signal S80 turns off, but delayed by a predetermined wait time $\alpha 2$. Additionally, the on/off signal S100 is generated to turn off at the same time as when the on/off signal S40 turns off.

By generating the on/off signal S90 and the on/off signal S100 in this way, the current flowing through the parasitic diode of the MOSFET 270 and the MOSFET 280 can be reduced. In other words, because synchronous rectification is achieved, the efficiency of the DC-DC converter 400 can be increased.

Note that to achieve zero voltage switching in addition to preventing a short of the MOSFETs on the upper and lower arms of each phase of the DC-DC converter 400, it is desirable to provide a dead time for each of the on/off signals S30 to S60 of the MOSFETs 210 to 240 of the DC-DC converter 400. Also, in the case in which the duty ratio (Duty) input into the switching signal generator 335 is 0 (zero), the switching signal generator 335 generates the on/off signals S30 to S100 of the MOSFETs 210 to 280 of the DC-DC converter 400 such that all signals are off.

Figure 6:
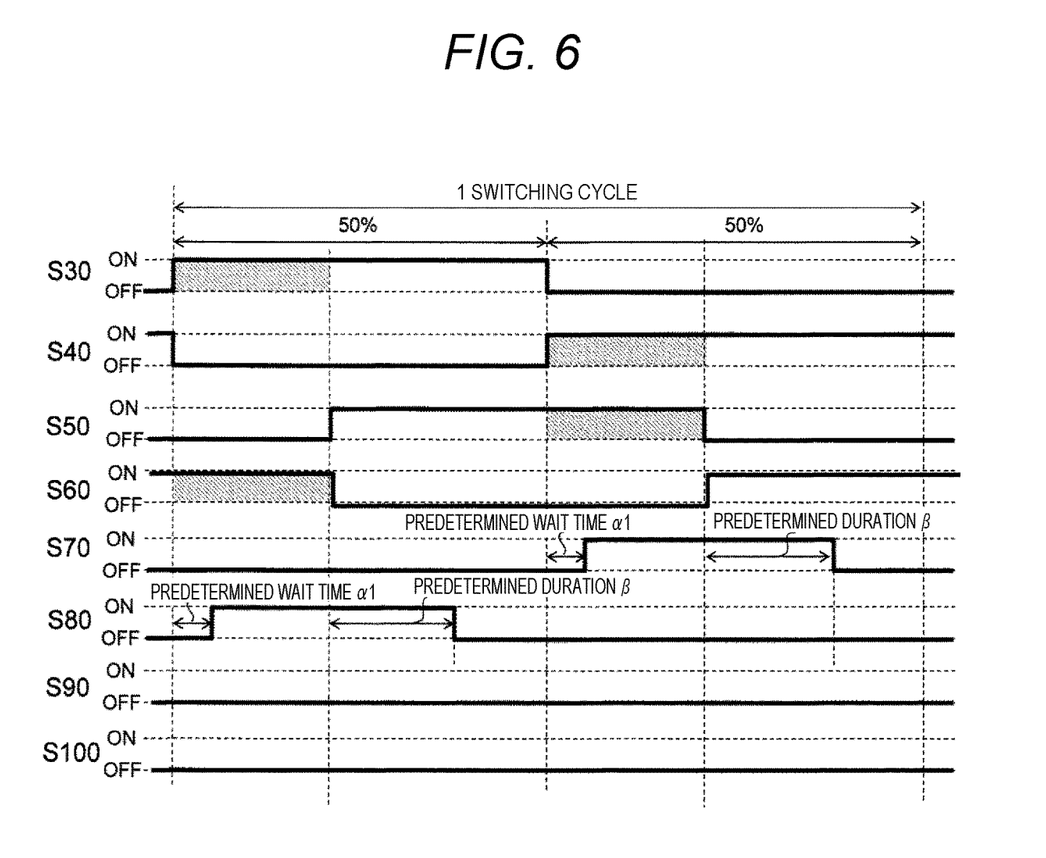
FIG. 6 is a diagram explaining operations in an asynchronous control mode of the DC-DC converter according to the first embodiment of the present invention.

FIG. 6 is a diagram explaining asynchronous control, that is, operations performed in the case in which the switching method toggle flag fSwitch is 0 (asynchronous control mode) in one form of the switching signal generator 335 applying phase-shifted PWM provided in the controller 310 of the DC-DC converter 400 that is a power conversion device according to Example 1 of the present invention.

In FIG. 6, the switching signal generator 335 generates the on/off signals S30, S40, S50, S60, S70, and S80, and the signal outputs are similar to the case of the synchronous control, that is, the case where the switching method toggle flag fSwitch is 1, as illustrated in FIG. 5.

Next, the switching signal generator 335 generates the on/off signal S90 of the MOSFET 270. The on/off signal S90 is generated to be always off.

Next, the switching signal generator 335 generates the on/off signal S100 of the MOSFET 280. The on/off signal S100 is generated to be always off.

Keeping the on/off signal S90 of the MOSFET 270 and the on/off signal S100 of the MOSFET 280 always off means that the switching duty ratio for causing the switching states of the high-voltage side switching circuit and the low-voltage side switching circuit to be asynchronous will be smaller than the switching duty ratio for causing the switching states of the high-voltage side switching circuit and the low-voltage side switching circuit to be synchronous.

By generating the on/off signal S90 and the on/off signal S100 in this way, current does not flow through the switch part of the MOSFET 270 and the MOSFET 280 and instead flows continuously through the parasitic diodes, and the direction of current flow can be limited. In other words, current does not flow from the drain to the source of the MOSFET 270 and the MOSFET 280, and is limited to flowing only from the source to the drain.

In the case in which a flow of current from the source to the drain of the MOSFET 270 and the MOSFET 280 is executed, current flows from the DC-DC converter 400 to the low-voltage side battery 100 and the load 110, thereby charging the low-voltage side battery 100 and supplying power to the load 110. Conversely, in the case in which a flow of current from the drain to the source of the MOSFET 270 and the MOSFET 280 is executed, current flows from the low-voltage side battery 100 and the load 110 toward the DC-DC converter 400, thereby causing current to flow to the primary circuit of the DC-DC converter 400 through the transformer 50, and ultimately causing a current to flow into and charge the high-voltage side battery 10 in this case.

Assuming that a principal function of the operations of the DC-DC converter 400 is to charge the low-voltage side battery 100 and supply power to the load 110 with power from the high-voltage side battery 10, in some cases it is desirable to prevent the operation of charging the high-voltage side battery 10 with power from the low-voltage battery side 100. In such cases, by executing the asynchronous control as described in FIG. 6, it becomes possible to prevent an unintended operation of charging the high-voltage side battery 10 with power from the low-voltage side battery 100.

As above, Example 1 of the present invention is configured as follows. The snubber capacitor (surge voltage-suppressing capacitor) 25 capable of absorbing a switching surge is connected in parallel with the switching circuit on the low-voltage side (the circuit including the switching elements 250, 260, 270, and 280 that convert AC to DC). From when a request to start switching is received until a predetermined time elapses, it is determined that the snubber capacitor 25 has not reached full charge or near-full charge, and the low-voltage side switching circuit and the high-voltage side switching circuit (the circuit including the switching elements 210, 220, 230, and 240 that convert DC to AC) are controlled asynchronously. After the predetermined time elapses, the controller 310 controls the switching circuit on the low-voltage side and the switching circuit on the high-voltage side synchronously, and additionally controls the duty ratio of the switching circuit on the low-voltage side and the switching circuit on the high-voltage side such that current backflow does not occur.

Therefore, according to Example 1 of the present invention, it is possible to achieve a power conversion device, namely a DC-DC converter, that is capable of suppressing current backflow while also improving current responsiveness and power conversion efficiency.

Example 2

Next, Example 2 of the present invention will be described.

Because the overall configuration and operations of Example 2 are similar to the circuit illustrated in FIG. 1, the internal function blocks illustrated in FIG. 2, the flow illustrated in FIG. 4, and the flow illustrated in FIG. 5, diagrammatic illustration and detailed description will be omitted. However, the switching method toggle unit 325 in FIG. 2 is configured to be supplied with the detected voltage from the voltage sensor 193. The difference between Example 1 and Example 2 is in the flow of determining whether to set the asynchronous control mode or the synchronous control mode. In other words, in Example 2, the control mode is determined according to a different flow from the flow illustrated in FIG. 3.

Figure 7:
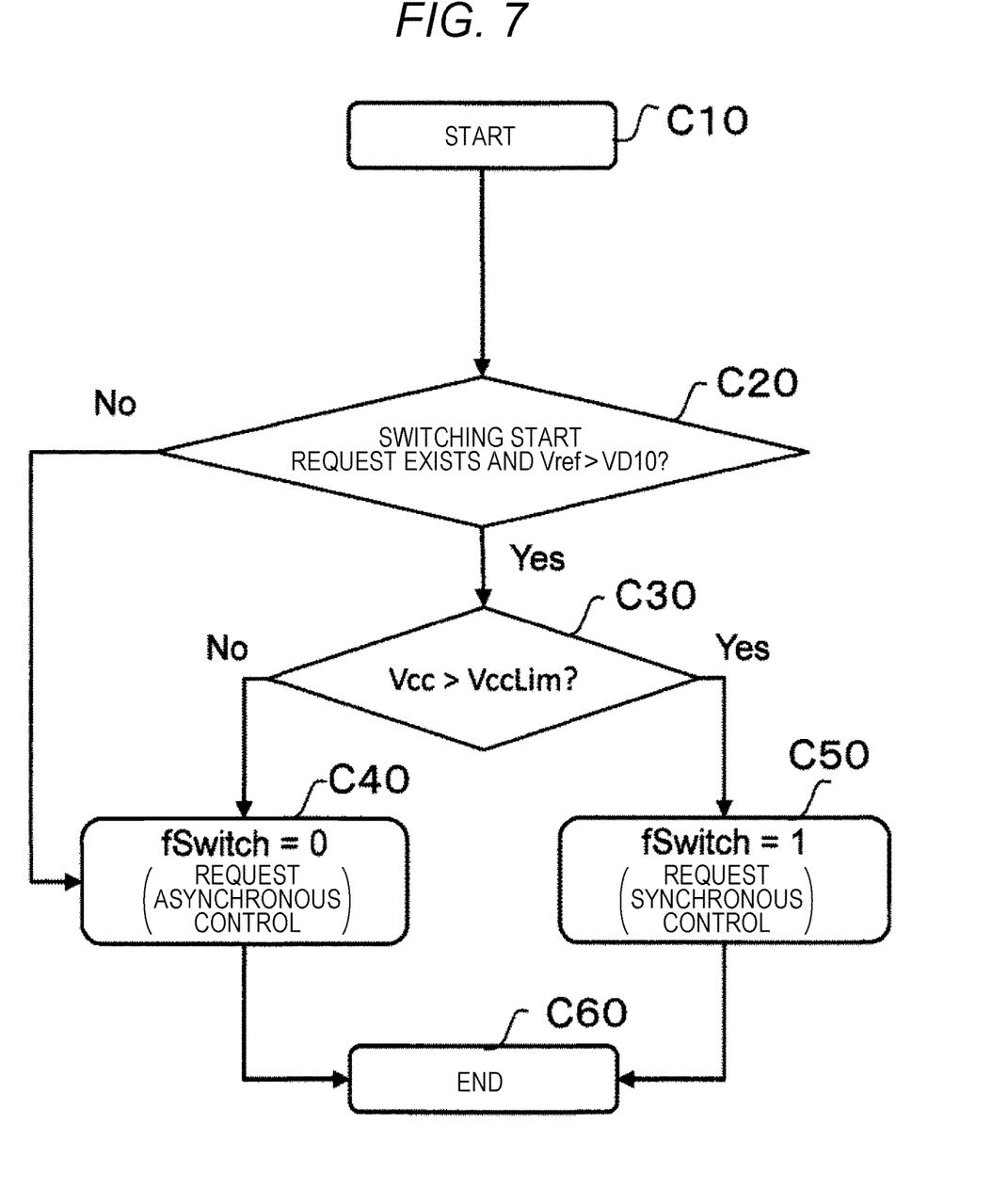
FIG. 7 is a flowchart explaining a process for one processing cycle executed by a switching control method toggle unit according to Example 2 of the present invention.

FIG. 7 is a flowchart explaining a process for one processing cycle executed by the switching method toggle unit 325 in Example 2 of the present invention. Following this flow, the switching method toggle unit 325 executes a repeating process.

In step C10 of FIG. 7, the process is started, and the flow proceeds to step C20. In step C20, the operation command fReq is monitored to confirm whether a switching start request exists (condition 1) and also whether the output voltage command Vref exceeds the digital value VD10 of the output voltage (condition 2).

In the case in which the above conditions 1 and 2 hold at the same time in step C20, the flow proceeds to step C30, whereas in the case in which either or both of the conditions do not hold in step C20, the flow proceeds to step A40.

In step C30, a voltage detection value Vcc of the voltage sensor 193 is supplied to the switching method toggle unit 325, and it is determined whether the voltage detection value Vcc exceeds a predetermined value VccLim stored in the controller 310 in advance. In other words, it is determined whether or not the snubber capacitor 193 has reached full charge or near-full charge.

In step C30, in the case in which the voltage detection value Vcc does not exceed the predetermined value VccLim, the flow proceeds to step C40, whereas in the case in which the voltage detection value Vcc exceeds the predetermined value VccLim, the flow proceeds to step C50.

In step C40, the switching method toggle flag fswitch is set to 0 and output. In the case where the flag fswitch is set to 0, the switching signal generator 335 is requested to perform operations in the switching control mode (asynchronous control mode) that stops the switching operations of the MOSFETs 270 and 280. After the output of a signal requesting operation in the asynchronous control mode is completed, the flow proceeds to step C60.

In step C50 proceeding from step C30, the switching method toggle flag fswitch is set to 1 and output. In the case where the switching method toggle flag fswitch is set to 1, the switching signal generator 335 is requested to perform operations in the switching control mode (synchronous control mode) that executes the switching operations of the MOSFETs 250, 260270, and 280 in synchronization with the MOSFETs 210, 220, 230, and 240. After the output of a signal requesting operation in the synchronous control mode is completed, the flow proceeds to step C60.

In step C60, the process for one processing cycle actually executed by the switching method toggle unit 325 ends.

Effects similar to Example 1 can also be obtained in Example 2 described above.

Example 3

Next, Example 3 of the present invention will be described.

In Examples 1 and 2 described above, the switching elements of the switching circuit on the low-voltage are all MOSFETs, but a configuration with similar control can be achieved even if diodes are used as some of the switching elements.

Example 3 is an example in which diodes are used instead of MOSFETs for some of the switching elements of the switching circuit on the low-voltage side.

Figure 8:
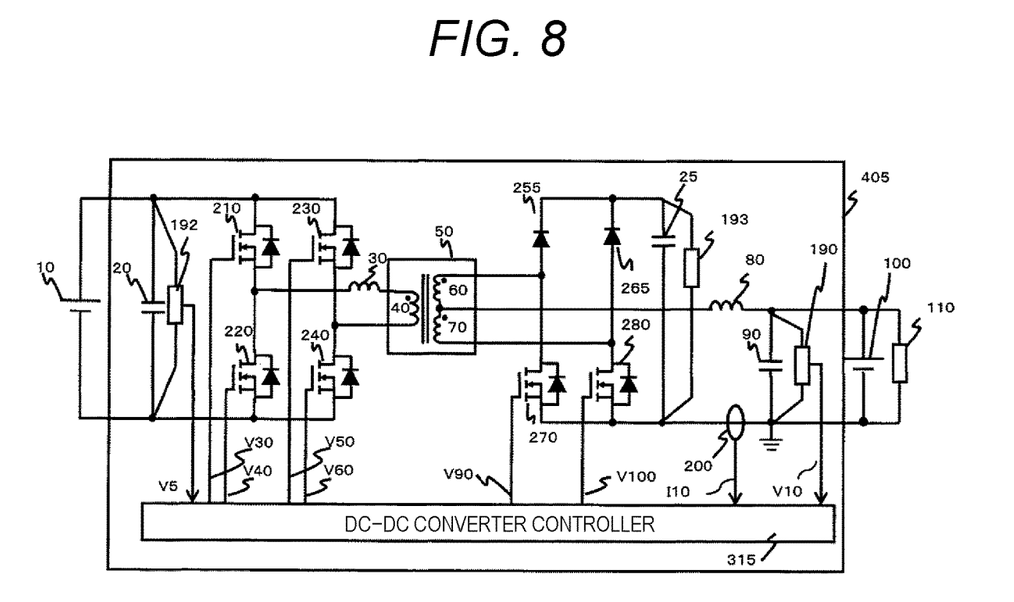
FIG. 8 is a circuit diagram of a DC-DC converter, which is a power conversion device according to Example 3 of the present invention.

FIG. 8 is a circuit diagram of a DC-DC converter 405, which is a power conversion device according to Example 3 of the present invention.

The differences between the example illustrated in FIG. 8 and the example illustrated in FIG. 1 are that a diode 255 is disposed instead of the MOSFET 250 and a diode 265 is disposed instead of the MOSFET 260 in the secondary circuit of FIG. 1 in the example illustrated in FIG. 8. The rest of the configuration is similar between the example illustrated in FIG. 1 and the example illustrated in FIG. 8.

In FIG. 8, in a DC-DC converter 405, the primary circuit is connected to the high-voltage side battery 10, while the secondary circuit is connected to the low-voltage side battery 100 and the auxiliary load 110 (hereinafter referred to as the load 110) in parallel. The primary circuit and the secondary circuit are magnetically coupled to the primary circuit through the transformer 50.

The primary circuit of the DC-DC converter 405 has substantially the same configuration as the primary circuit illustrated in FIG. 1.

The secondary circuit of the DC-DC converter 405 includes the smoothing capacitor 90, the smoothing inductor 80, the snubber capacitor 25, the voltage sensor 190, the current sensor 200, the MOSFETs 270 and 280, and the diodes 255 and 265. The primary circuit and the secondary circuit are electrically connected by the transformer 50.

One terminal of the secondary winding 70 of the transformer 50 is connected to the other terminal of the secondary winding 60 of the transformer 50 and one terminal of the smoothing inductor 80, while the other terminal of the secondary winding 70 is connected to the source of the diode 265 and the drain of the MOSFET 280.

The cathode of the diode 255 is connected to one terminal of the snubber capacitor 25, while the anode of the diode 255 is connected to one terminal of the secondary winding 60 of the transformer 50 and the drain of the MOSFET 270.

The cathode of the diode 265 is connected to one terminal of the snubber capacitor 25, while the anode of the diode 265 is connected to the other terminal of the secondary winding 70 of the transformer 50 and the drain of the MOSFET 280.

One terminal of a voltage sensor 193 is connected to the cathode of the diodes 255 and 265, while the other terminal of the voltage sensor 193 is connected to the source of the MOSFET 270, the source of the MOSFET 280, and one terminal of the current sensor 200. The current sensor 200 is configured by an amplifier such as a non-inverting amplifier or a differential amplifier using a voltage divider and an operational amplifier.

A controller 315 of the DC-DC converter 405 generates the gate voltage V30 for controlling the on/off state of a switching element of the DC-DC converter 405, namely the MOSFET 210, on the basis of the input voltage V5, the output voltage V10, and the output current I10, and inputs the generated gate voltage V30 into the gate of the MOSFET 210. Similarly, the controller 315 inputs the gate voltage V40 into the gate of the MOSFET 220, inputs the gate voltage V50 into the gate of the MOSFET 230, and inputs the gate voltage V60 into the gate of the MOSFET 240. Furthermore, the controller 315 inputs the gate voltage V90 into the gate of the MOSFET 270 and inputs the gate voltage V100 into the gate of the MOSFET 280.

However, the gate drive circuit 340 generates the gate voltages V30, V40, V50, V60, V70, V90, and V100 for switching on/off the MOSFETs 210, 220, 230, 240, 270, and 280 of the DC-DC converter 405 on the basis of the on/off signals S30, S40, S50, S60, S70, S80, S90, and S100 generated by the switching signal generator 335, but although the gate drive circuit 340 also generates V70 and V80, in Example 3, the MOSFETs 250 and 260 like in Example 1 do not exist. Consequently, the on/off signals S70 and S80 as well as the gate voltages V70 and V80 are invalid.

Even with such a configuration, because the power conversion operations are achievable by the switching operations of the MOSFETs 210, 220, 230, 240, 270, and 280, no problem arises.

Even in the case of using the configuration of Example 3 as above, by taking a configuration similar to the DC-DC converter controller 310 illustrated in FIG. 2, effects similar to the first Example are obtained.

Note that the power conversion device of the present invention is applicable not only to vehicles, but also to equipment such as trains and industrial robots, for example.

REFERENCE SIGNS LIST

10 High-voltage side battery
20 Filter capacitor
25 Snubber capacitor (surge voltage-suppressing capacitor)
40 Primary winding
50 Transformer
60, 70 Secondary winding
90 Smoothing capacitor
100 Low-voltage side battery
190, 192, 193 Voltage sensor
210, 220, 230, 240 High-voltage side switching element
250, 260, 270, 280 Low-voltage side switching element
310 Controller
320 A/D converter
325 Switching method toggle unit
330 Duty generator
335 Switching signal generator
340 Gate drive circuit

The invention claimed is:
1. A power conversion device comprising:
a transformer including a primary winding and a secondary winding;

a high-voltage side switching circuit connected between the primary winding of the transformer and a high-voltage side power supply;

a low-voltage side switching circuit connected between the secondary winding of the transformer and a low-voltage side power supply;

a surge voltage-suppressing capacitor electrically connected in parallel with the low-voltage switching circuit; and a controller configured to control switching states of the high-voltage side switching circuit and the low-voltage side switching circuit, wherein the controller detects a state of charge of the surge voltage-suppressing capacitor, if the controller determines that the surge voltage-suppressing capacitor has reached full charge or near-full charge, the controller asynchronously controls the switching states of the high-voltage side switching circuit and the low-voltage side switching circuit, if the controller determines that the surge voltage-suppressing capacitor has not reached full charge or near-full charge, the controller synchronously controls the switching states of the high-voltage side switching circuit and the low-voltage side switching circuit, in a case in which a predetermined time has elapsed since the controller started asynchronously controlling the switching states of the high-voltage side switching circuit and the low-voltage side switching circuit, the controller determines that the surge voltage-suppressing capacitor has reached full charge or near-full charge, the control includes a switching method toggle unit configured to generate a switching method toggle flag for the switching between asynchronously and synchronously controlling the switching state of the low-voltage side switching circuit and the switching state of the high-voltage side switching circuit, a duty generator configured to generate a switching duty ratio of the low-voltage side switching circuit and a switching duty ratio of the high-voltage side switching circuit on a basis of the switching method toggle flag generated by the switching method toggle unit, and a switching signal generator configured to generate switching signals for switching the low-voltage side switching circuit and for switching the high-voltage switching circuit, on a basis of the switching method toggle flag and the switching duty ratio of the low-voltage side switching circuit as well as the switching duty ratio of the high-voltage side switching circuit generated by the duty generator.

2. The power conversion device according to claim 1, further comprising:

a voltage sensor configured to detect a voltage of the surge voltage-suppressing capacitor, wherein in a case in which the voltage of the surge voltage-suppressing capacitor detected by the voltage sensor exceeds a predetermined value, the controller determines that the surge voltage-suppressing capacitor has reached full charge or near-full charge.

3. The power conversion device according to claim 1, wherein a switching duty ratio by which the controller asynchronously controls the switching states of the high-voltage side switching circuit and the low-voltage side switching circuit is smaller than a switching duty ratio by which the controller synchronously controls the switching states of the high-voltage side switching circuit and the low-voltage side switching circuit.

4. The power conversion device according to claim 1, wherein the power conversion device is a DC-DC converter onboard a vehicle.

* * * * *